United States Patent
Castro Borquez et al.

(10) Patent No.: US 12,321,660 B2
(45) Date of Patent: Jun. 3, 2025

(54) ROBOTIC SYSTEM FOR CONTROLLING AUDIO SYSTEMS

(71) Applicant: Neural DSP Technologies OY, Helsinki (FI)

(72) Inventors: Douglas Andres Castro Borquez, Helsinki (FI); Eero-Pekka Damskägg, Helsinki (FI); Athanasios Gotsopoulos, Helsinki (FI); Lauri Tuomas Juvela, Helsinki (FI); Aleksi Tapani Peussa, Helsinki (FI); Kimmo Erik Antero Rauhanen, Helsinki (FI); Thomas Sherson, Helsinki (FI)

( * ) Notice: Subject to any disclaimer, the term of this patent is extended or adjusted under 35 U.S.C. 154(b) by 0 days.

(21) Appl. No.: 18/665,895

(22) Filed: May 16, 2024

(65) Prior Publication Data

US 2024/0385798 A1    Nov. 21, 2024

Related U.S. Application Data

(63) Continuation of application No. 17/669,707, filed on Feb. 11, 2022, now Pat. No. 12,014,108.
(Continued)

(51) Int. Cl.
    *G06F 3/16*    (2006.01)
    *B25J 9/12*    (2006.01)
    (Continued)

(52) U.S. Cl.
    CPC .............. *G06F 3/162* (2013.01); *B25J 9/123* (2013.01); *B25J 9/1682* (2013.01); *G06F 3/165* (2013.01);
    (Continued)

(58) Field of Classification Search
    CPC ..... G06F 3/16; G06F 3/165; B25J 9/12; B25J 9/16; G10H 1/00; G10H 1/46;
    (Continued)

(56) References Cited

U.S. PATENT DOCUMENTS 9,589,549 B1    3/2017   McKay, II
10,140,087 B2   11/2018  Barrett
(Continued)

FOREIGN PATENT DOCUMENTS

CZ    307875 B6    7/2019
ES    2726498 A1   7/2019

OTHER PUBLICATIONS

Extended European Search Report for European Patent Application No. 21156974.4; European Patent Office, Munich Germany 80298; date of mailing Jul. 16, 2021.

*Primary Examiner* — Yosef K Laekemariam
(74) *Attorney, Agent, or Firm* — Thomas E. Lees, LLC

(57) ABSTRACT

A robotic system is provided, which automatically changes settings on an audio system. The audio system (e.g., an instrument amplifier, effect processor, etc.) typically includes one or more controls that impact the operation of the audio system. Correspondingly, the robotic system includes a device interface coupled to a control sequencer. The device interface adapts to one or more controls of the audio system that are to be changed. In this regard, the device interface includes one or more control couplers. Each control coupler is adapted to a corresponding control of the audio system to be changed. The control sequencer provides a control sequence to the device interface that causes the control coupler(s) to vary the settings on the audio system. In practical applications, a combination of sequence values of the control sequence can represent a sufficiently high number of samples to determine a responsive behavior of the audio system.

20 Claims, 10 Drawing Sheets

Related U.S. Application Data

(60) Provisional application No. 63/148,692, filed on Feb. 12, 2021, provisional application No. 63/149,170, filed on Feb. 12, 2021.

(51) Int. Cl.
  *B25J 9/16* (2006.01)
  *G10H 1/00* (2006.01)
  *G10H 1/46* (2006.01)
  *H04S 7/00* (2006.01)

(52) U.S. Cl.
  CPC ............ *G10H 1/0033* (2013.01); *G10H 1/46* (2013.01); *H04S 7/30* (2013.01); *G10H 2210/155* (2013.01); *H04S 2400/01* (2013.01)

(58) Field of Classification Search
  CPC ....... G10H 2210/155; G10H 2250/311; G10H 3/187; H04S 7/30; H04S 7/00; G05B 2219/40411
  See application file for complete search history.

(56) References Cited

U.S. PATENT DOCUMENTS

| | | | |
|---|---|---|---|
| 2010/0229710 A1* | 9/2010 | Schoewer | G10H 3/187 84/701 |
| 2018/0007458 A1* | 1/2018 | DeJarnette | H04R 3/04 |
| 2021/0166718 A1* | 6/2021 | Castro Borquez | G06F 3/165 |

\* cited by examiner

| Input level | Input wav | pot0 label | pot0 target | pot1 label | pot1 target | ... | raw input wav | target wav |
|---|---|---|---|---|---|---|---|---|
| 0 | /share/Projects/... | High | 0.89 | Drive | 0.28 | ... | /share/Projects/Data... | /share/Projects/Data... |
| -6 | /share/Projects/... | High | 0.89 | Drive | 0.28 | ... | /share/Projects/Data... | /share/Projects/Data... |
| 0 | /share/Projects/... | High | 0.16 | Drive | 0.8 | ... | /share/Projects/Data... | /share/Projects/Data... |
| -6 | /share/Projects/... | High | 0.16 | Drive | 0.8 | ... | /share/Projects/Data... | /share/Projects/Data... |
| 0 | /share/Projects/... | High | 0.51 | Drive | 0.74 | ... | /share/Projects/Data... | /share/Projects/Data... |
| -6 | /share/Projects/... | High | 0.51 | Drive | 0.74 | ... | /share/Projects/Data... | /share/Projects/Data... |
| 0 | /share/Projects/... | High | 0.16 | Drive | 0.37 | ... | /share/Projects/Data... | /share/Projects/Data... |

FIG. 1

| CONTROLS | AVERAGE WEAR | MAXIMUM WEAR | SAMPLES |
|---|---|---|---|
| 2 | 5 | 9 | 25 |
| 3 | 19 | 49 | 125 |
| 4 | 77 | 249 | 625 |
| 5 | 311 | 1 249 | 3 125 |
| 6 | 1 301 | 6 249 | 15 625 |
| 7 | 5 579 | 31 29 | 78 125 |
| 8 | 24 413 | 156 249 | 390 625 |
| 9 | 108 505 | 781 249 | 1 953 125 |
| 10 | 488 280 | 3 906 249 | 9 765 625 |

FIG. 6

| CONTROLS | AVERAGE WEAR | MAXIMUM WEAR | SAMPLES |
|---|---|---|---|
| 2 | 11 | 21 | 121 |
| 3 | 87 | 240 | 1 331 |
| 4 | 730 | 2 660 | 14 641 |
| 5 | 6 440 | 29 280 | 161 051 |
| 6 | 59 050 | 322 100 | 1 771 561 |
| 7 | 556 775 | 3 543 121 | 19 487 171 |

FIG. 7

| CONTROLS | AVERAGE WEAR | MAXIMUM WEAR | SAMPLES |
|---|---|---|---|
| 2 | 2 | 3 | 25 |
| 3 | 10 | 11 | 125 |
| 4 | 47 | 49 | 625 |
| 5 | 214 | 217 | 3 125 |

FIG. 8

| CONTROLS | MIN | MAX | MEAN |
|---|---|---|---|
| 2 | 0.25 | 1.25 | 0.41 |
| 3 | 0.25 | 2.25 | 0.47 |
| 4 | 0.25 | 3.25 | 0.49 |

FIG. 10

| CONTROLS | MIN | MAX | MEAN |
|---|---|---|---|
| 2 | 0.02 | 0.60 | 0.22 |
| 3 | 0.05 | 0.67 | 0.25 |
| 4 | 0.05 | 1.03 | 0.29 |

FIG. 11

ROBOTIC SYSTEM FOR CONTROLLING AUDIO SYSTEMS

CROSS REFERENCE TO RELATED APPLICATIONS

This application is a continuation of U.S. patent application Ser. No. 17/669,707, filed Feb. 11, 2022, entitled "Robotic System for Controlling Audio Systems", now allowed, which claims the benefit of U.S. provisional patent application Ser. No. 63/148,692, filed Feb. 12, 2021, entitled "Robotic System for Controlling Audio Systems," and U.S. provisional patent application Ser. No. 63/149,170, filed Feb. 12, 2021, entitled "Emulating Behavior of Audio Systems," both of which are incorporated herein by reference in their entireties as if set forth expressly herein.

BACKGROUND

Field of the Disclosure

The present disclosure relates generally to robotics and to robotic systems for controlling audio systems. Aspects herein relate more particularly, to robotic systems that adjust settings of audio systems for purposes of determining and/or capturing the responsive behavior of the audio systems.

Description of Related Art

Audio systems (such as, for example, audio amplifiers) exhibit different responses based on many different factors. For example, the behavior of an audio system can vary based on the settings of the controls provided by the audio system (e.g., volume, treble, and bass controls). Also, different audio systems provide different types and styles of controls. These differences can vary widely across different manufacturers. Yet further, the response of audio systems can vary based upon topology, technology (e.g., vacuum tube, solid-state, hybrid, etc.), and a plethora of other factors.

SUMMARY

Aspects of the present disclosure provide robotic systems that automatically change settings of controls provided on audio systems. In some embodiments, a robotic system herein includes a device interface coupled to a control sequencer. The device interface adapts to one or more controls of the audio system that are to be changed. The control sequencer provides a control sequence to the device interface where each step in the sequence provides control value(s) that cause the device interface to vary the settings on the audio system.

In practical applications, a combination of sequence values of the control sequence can be used to generate samples that represent a responsive behavior of the audio system. In practical applications, a sufficiently high number of generated samples may accurately determine a responsive behavior of the audio system, at least across the range of settings of the audio system that are characterized by the control sequence.

In some embodiments, the robotic system can also include a signal generator that provides an input signal to the audio system and a receiver that receives an output signal from the audio system. The output signal represents the response of the audio system to the input signal at the current control settings. Thus, by applying an input signal that varies across a range of expected inputs to the audio system (e.g., typically sweeps across variations in amplitude and/or frequency) at the input, the robotic system measures a response of the audio system via the output at each setting. Moreover, by stepping through the control sequence iteratively and by capturing a response of the audio device at each iteration, a responsive behavior of the audio system can be captured across different settings of the audio system.

Aspects of the present disclosure also provide robotic systems and automated processes for determining responsive behaviors of audio systems (e.g., audio amplifiers, audio processors, audio devices (such as effect pedals), passive circuits, speaker cabinets, environments, etc.). An embodiment comprises a robotic system that automatically changes settings on an audio system and provides an input to the audio system at each of the changed settings. The robotic system measures a response at each setting. The embodiment of the robotic system also comprises a control sequencer that provides control sequences. Each control sequence changes at least one variable associated with the audio system. In illustrated examples, the control sequence(s) can correspond to an audio system control (e.g., volume, bass, drive, treble, other control that affects a captured output of the audio system, combinations thereof, etc.), with each of the individual control sequences having its own sequence values. The sequence values correspond to valid predetermined control settings for that control. A combination of the sequence values (e.g., all of the sequence values or a subset thereof, from all the control sequences) represents a sufficiently high number of samples that are used to determine a responsive behavior of the audio system, e.g., at least across the range of settings characterized by the control sequence(s).

In some embodiments, the combination of sequence values from the control sequences is generated in a non-linear or non-stepwise manner. By way of example, sequence values can be derived from a random sampling process, e.g., a sufficiently dense random sampling process.

As a robotic system, some embodiments comprise motor controllers that control motors. The motor controllers receive the sequence values from the control sequencer. Each sequence value is received iteratively and is converted to a corresponding motor setting.

The robotic system further comprises control couplers that couple (or are otherwise adapted to be coupled) to the motors to affect measures of the response of the audio system. For instance, the control couplers can couple to audio system controls, thereby allowing the motors to change control settings of the audio system. In other embodiments, the control couplers can control the movement or positioning of a microphone capturing the response of a speaker, e.g., affecting movement along one or more axes, moving a recording device that captures an environment of the audio system, etc.

Yet further, in some embodiments, a signal generator provides an input signal to the audio system and a receiver receives an output signal from the audio system. The output signal represents the response of the audio system to the input signal at the control setting(s).

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a chart showing one embodiment of control sequences that are provided by a control sequencer in a robotic system for determining a responsive behavior of audio systems.

FIG. 6 is a table showing example numerical values that represent mechanical wear for different numbers of controls when regular grid sampling is employed for five (5) equally spaced control values.

FIG. 7 is a table showing example numerical values that represent mechanical wear for different numbers of controls when regular grid sampling is employed for eleven (11) equally spaced control values.

FIG. 8 is a table showing example numerical values when a sufficiently dense sorted path of random samples is employed instead of the regular grid sampling of FIGS. 6 and 7.

FIG. 10 is a table showing average travel across all pairs of consecutive values for a regular grid sampling with five (5) equally spaced control values.

FIG. 11 is a table showing average travel across all pairs of consecutive values for samples that are generated from a sufficiently dense random sampling process.

DETAILED DESCRIPTION OF THE EMBODIMENTS

Figure 2:
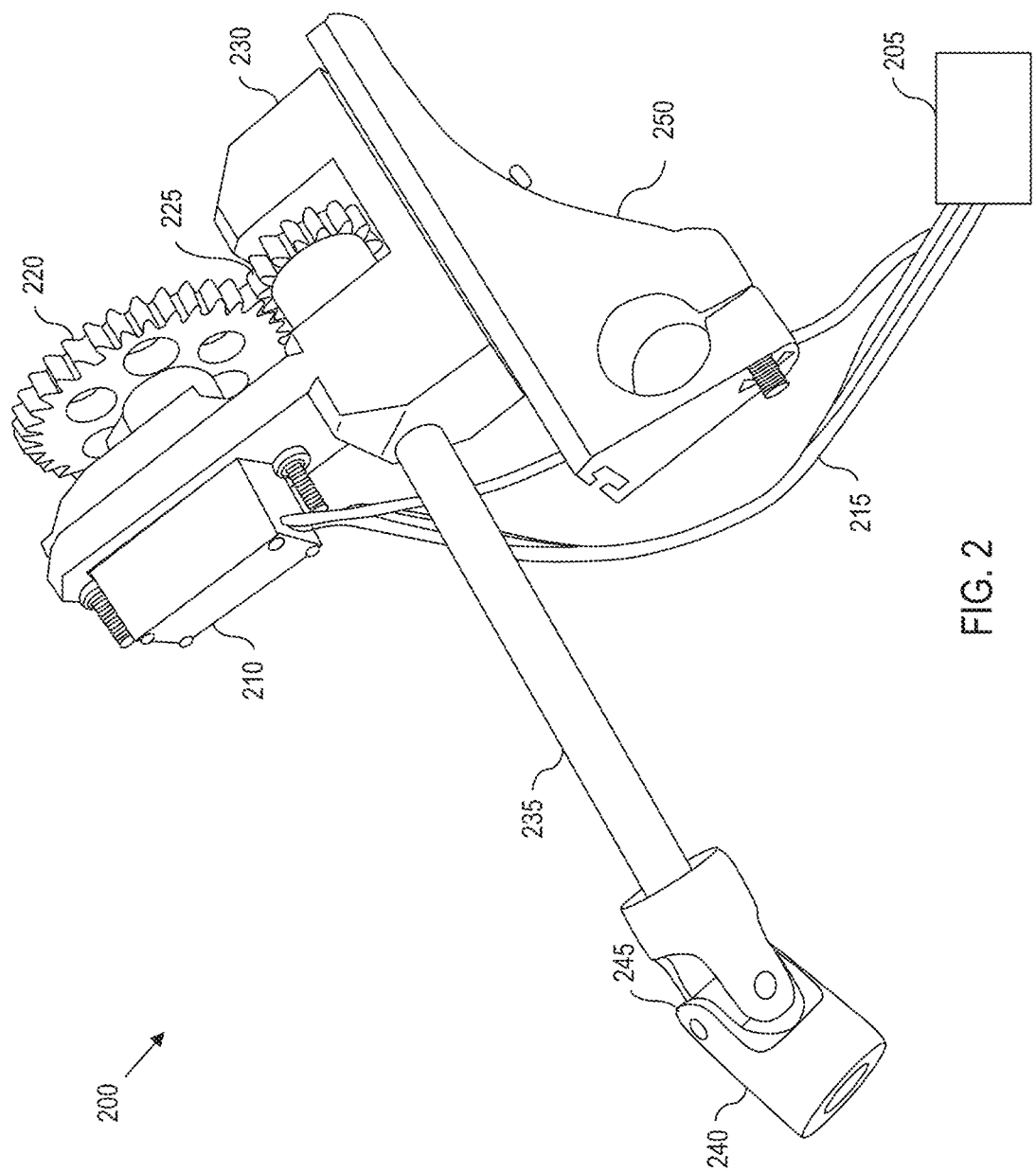
FIG. 2 is a diagram showing an embodiment of mechanical components in the robotic system for determining a responsive behavior of audio systems.

Audio systems behave differently based on many different factors. For example, the behavior of an audio system can differ based on the settings of the controls (e.g., volume, treble, bass) provided on the audio system. In this regard, audio system controls (and hence, the audio system settings) are frequently adjusted to obtain a desired sound effect for a given application/input source. Moreover, the controls of many audio systems are interactive, such that adjusting one or more controls can have an unusual or unexpected impact on the tone of the output. As such, capturing a response of an audio system at a single setting may not be representative of how an audio system reacts across a range of settings. Moreover, capturing a response of an audio system at a single setting may not be representative of how an individual, e.g., a musician, interacts with a physical instance of the audio system.

Because of this, aspects herein provide a robotic system that can capture a response of an audio system across different settings. Such information can lead to understanding how a particular audio system behaves in response to different types of inputs at different settings. Moreover, the response collected across various settings can be utilized to generate responsive captures that more accurately reflect interaction with a corresponding audio system. In this regard, a responsive behavior is captured that reflects differences in the audio system at different control settings.

As used herein, an audio system can comprise an amplifier, such as a guitar amplifier, bass guitar amplifier, keyboard amplifier, etc. An audio system can also comprise an effects processor, effect pedal, pre-amplifier, signal processing device (e.g., an equalizer, compressor, limiter, noise gate, pitch shifter, delay, expander, or filter), or other device that processes one or more audio signals. Typically, such audio systems will include one or more controls. Each control provides two or more settings that affect operation of the audio system. Often, such controls are implemented by an electrical-mechanical device such as a potentiometer, encoder, linear/slide potentiometer, switch, rotary switch, push button, etc.

In some instances, the control can be "virtual", e.g., implemented as a software object on a graphical user interface (e.g., touchscreen). In this instance, the control may be generalized as a "widget". Also, some controls may rely upon an electrical input (e.g., a control may be a connector for receiving control messages such as Musical Instrument Digital Interface (MIDI) messages, an expression pedal input, a control voltage input, or other means).

In yet other example embodiments, an audio system can comprise a speaker cabinet that is sensitive to microphone placement when capturing the output of the speaker cabinet. Here, moving the microphone affects how the speaker cabinet is perceived. Similarly, moving a microphone in an environment affects how the audio system is perceived in the environment.

Regardless of the above, as used herein, a "control" of an audio system is any adjustable feature, whether physical (e.g., requiring physical movement, physical connection to, physical contact, proximity to, combinations thereof, etc.), virtual (e.g., "soft" control implemented via a touch display, implemented via a graphical user interface, etc.), and whether user-adjustable (e.g., physically adjustable) or whether adjustable electrically, to affect operation of the audio system.

Moreover, as used herein, with reference to a control, a "setting" comprises a particular state of the control. For instance, a potentiometer that functions as a volume control can have a range of settings from a minimum potentiometer position to a maximum potentiometer position. This range of positions is often generalized across a simplified set of values, such as 0-10, etc. A push button switch may have only two settings, whereas a rotary switch can have multiple discrete settings (e.g., 6 or more settings).

In some embodiments, a setting of a control can be defined across the entirety of the valid positions of the control. In other embodiments, a setting can be limited to a range of valid positions, e.g., a sweep from a predetermined minimum value to a predetermined maximum value. In some example embodiments, settings can have an "imposed" range, e.g., that is defined by the limits of the robotic system, or are otherwise defined by deliberate and intended limitations to a range of settings. For instance, recording a speaker cabinet, a predefined minimum and maximum microphone movement distance can be defined. For a potentiometer acting as a volume potentiometer, an artificial minimum value may be set (e.g., to a value of 1)

because a setting of "off" or zero may result in no sound from the audio system. Other examples are possible.

With reference to a "setting" when referring to an audio system, a setting is a particular state of each control associated with the audio device. In certain applications, some controls and/or control parameters may be considered "don't care". For instance, in a multi-channel amplifier, where only one channel is being evaluated, the controls of the non-evaluated channels can be "don't care" controls. In this context, "setting" when referred to an audio system means, those controls of an audio system that are of interest.

According to aspects herein, an approach to emulate the responsive behavior of a particular audio system comprises measuring responses of the audio system at each (or substantially all) of the audio system's settings. In other words, each individual control (e.g., volume control, bass control, treble control, gain control, presence control, contour control, bright switch, etc.) is changed incrementally and a response is measured for each of the individual settings. While this approach may be suitable for simple audio systems, (e.g., a small number of controls such as one potentiometer and one switch), this approach becomes problematic for audio systems with many controls.

As one can imagine, for an example audio system with five (5) controls such as potentiometers (which is somewhat common in the guitar and bass amplifier industry), if each control has ten (10) possible settings to be evaluated, then the total number of settings necessary to determine a full responsive behavior would be 100,000 individual measurements (one at each setting). Further, for linear (non-stepped) devices such as potentiometers, the range from a minimum value to a maximum value can be broken down into more than 10 possible positions, depending upon the desired resolution.

Equally problematic as (or even more problematic than) the time required for all these measurements is the repetitive and mechanical wear on the components. Because a response of the audio device can be measured at each unique setting, the audio system settings must be changed in direct proportion to the number of controls (e.g., potentiometers sliders, toggle switches, multi-way switches, concentric potentiometers, push-pull potentiometers, rotary encoders, foot switches, etc.) and the number of settings for each control. Thus, again using an example audio system having a 5 potentiometer; 10 settings each potentiometer example configuration, at least 100,000 unique control settings would be required.

What is not readily apparent is that a systematically iterative approach results in uneven wear of components. Keeping with the above example, for each turn of a first potentiometer, a second potentiometer would require a minimum of ten (10) turns. Likewise, for each turn of the second potentiometer, a third potentiometer would require a minimum of ten (10) turns; and so on. Thus, mathematically, the fifth potentiometer experiences a 10,000-fold number of turns as compared to the first potentiometer. If the controls are implemented with potentiometers, then each control of the audio system has a limited usable life because potentiometers (which include mechanical components) have a finite number of duty cycles before malfunctioning. As such, the durability of the audio system becomes dependent on the most vulnerable component, namely, the potentiometer in this example, that has been turned 10,000-fold. In practical instances, some audio systems can include 20-30 user-adjustable controls, exacerbating the above even further.

To address the drawback of determining a responsive behavior of an audio system by taking nearly unmanageable numbers of measurements over long periods of time at the cost of excessive wear-and-tear to components, aspects of the present disclosure provide robotic systems and automated processes for determining responsive behaviors of audio systems without using every setting on the audio system.

General Overview

Aspects of the present disclosure provide robotic systems that automatically change settings on an audio system. As noted more fully herein, the audio system typically includes one or more controls that impact the operation of the audio system. In this regard, the robotic system is programmed to adjust the audio system across a predetermined range of settings.

Here, the "range of settings" can be all settings across all controls, all settings across a subset of controls, a subset of settings across each of the controls, a subset of settings across a subset of controls, a combination of an entire range of settings or subset of settings per control across all or a subset of controls, etc. Thus, by way of non-limiting illustration, a potentiometer may be adjustable from a range of 1-10, but the desired range of settings may indicate that only the range of 1-5 is of interest. As another example, a switch may select different gain ranges at different switch positions, but only a subset of those switch positions may be of interest, etc.

In an example implementation the robotic system herein includes a device interface coupled to a control sequencer. The device interface adapts to one or more controls of the audio system that are to be changed. The control sequencer provides a control sequence to the device interface where each step in the sequence provides control value(s) that cause the device interface to vary the settings associated with the audio system. By way of example, in some embodiments, a control sequence defines for each iteration/step, a corresponding setting for each control to be adjusted. In other embodiments, a control sequence is provided for each control (e.g., volume, bass, treble, drive, etc.), to be adjusted. In this regard, each control sequence has a unique/particular set of sequence values for each iteration/step of that control sequence that accounts for the range of valid setting values for the associated control. The sequence values correspond to valid predetermined control settings for that control of the audio system.

In some embodiments, the robotic system can also include a signal generator that provides an input signal to the audio system and a receiver that receives an output signal from the audio system. The output signal represents the response of the audio system to the input signal at the current control settings. Thus, by applying an input signal that varies across a range of expected inputs to the audio system (e.g., sweeps across variations in amplitude and frequency) at the input, the receiver of the robotic system measures a response of the audio system via the output at each setting. Moreover, by stepping through the control sequence iteratively and by capturing a response of the audio system at each iteration, a responsive behavior of the audio system can be captured that reflects different settings of the audio system.

In practical applications, a combination of sequence values of the control sequence(s) can represent a sufficiently high number of samples to determine a responsive behavior of the audio system, at least across the range of settings of the audio system that are characterized by the control sequence. The number of samples (steps or iterations of the control sequence) required to be "sufficiently high" will depend upon the desired accuracy. By way of example, a "sufficiently high" number of sequence iterations can depend upon factors such as the number of controls, number of settings per control, desired accuracy of the responsive behavior to precisely match the audio system, etc.

In an example implementation, the combination of sequence values of the control sequence(s) is/are generated by a sufficiently dense random sampling process. In other words, rather than recursively measuring every possible combination of settings, the disclosed embodiments generate a sufficiently large number of samples of settings, instead of all the possible combinations of samples, thereby reducing the time that is involved in determining the responsive behaviors of audio systems. For some embodiments, the samples are generated/sorted to reduce wear on the audio systems. Because of the randomization of the sequence values, system-related artifacts, or process-related artifacts (e.g., time-dependent drift, circuit-temperature-dependent drift, etc.) are also reduced. Furthermore, because a sufficiently high number of samples are collected, the responsive behavior of the audio system is determinable through statistical processes.

For clarity, a sufficiently high number of samples can be characterized herein as a number that is high enough to permit reliable statistical analysis. Thus, although the number might vary depending on context, sample size is determined as a function of the desired analytical context. Similarly, a sufficiently dense random sampling means having enough different sampling points to permit reliable statistical analysis. Again, the density will vary based on context. However, those having ordinary skill in the art are fully enabled and capable of determining correct sample size and understanding how to calculate a sufficiently high number of samples for purposes of a sufficiently dense random sampling. Consequently, although only a truncated discussion is provided herein of what is a sufficiently high number of samples or a sufficiently dense random sampling, specific numerical examples are provided with reference to FIGS. 6 through 11 to illustrate the advantages of sufficiently dense random sampling.

As a robotic system, in some embodiments, the device interface comprises motor controllers that control motors. The motor controllers receive the sequence values from the control sequencer. Each sequence value is received iteratively and is converted to corresponding motor settings. In this regard, a "motor" can mean a motor, linear actuator, or other device capable of causing motion (including movement along one or more axes) to cause an associated control associated with the audio system to change to a desired setting. Thus, changes can be affected rotationally, along a defined axis, in multiple axes (X, Y, Z), combinations thereof, etc. Here, the audio system, environment, nature of the behavior of the audio system to be evaluated, and other factors can determine the specific configuration.

The robotic system further comprises control couplers that couple the motors to the controls, thereby allowing the motors to change control settings. Here, the precise configuration of the control coupler can vary depending upon the type of control of the audio system to be controlled. For instance, a control coupler intended to adjust a potentiometer, encoder, or rotary switch can mechanically attach to a shaft of the controller (e.g., to a shaft of the potentiometer, encoder, rotary switch, etc.). Here, the size/shape of the shaft, whether there is a knob or if the knob can be removed, the positioning of the shaft on the audio system relative to the positioning of the corresponding motor etc., will dictate the specific configuration of a given control coupler. Alternatively, a control coupler to flip or push a switch will attach to an actuator/toggle of the switch, etc., and will thus require a corresponding configuration. A control coupler to control a microphone used to capture a response of the audio system can be mounted to a sled or other configuration that provides controlled movement along at least one axis. Here, a microphone stand or other mount can connect to the control coupler to control the positioning of the microphone.

The response of the audio system to the input signal at the various control settings can be used to train machine-learning algorithms (such as neural networks) to emulate the behavior of many different types of audio systems. For such a machine-learning emulation system, the response of the audio system serves as the ground-truth for the machine-learning emulation system. By way of non-limiting example, the response of the audio system can be used in conjunction with a neural network model as described in U.S. patent application Ser. No. 16/738,512, having the title "Neural Modeler of Audio Systems", filed Jun. 25, 2020, which is incorporated by reference in its entirety.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Examples

Turning to FIG. 1, disclosed is a chart showing an embodiment of control sequences 100 that are provided by a control sequencer in a robotic system for determining responsive behaviors of audio systems. The chart shown in FIG. 1 is an example but can be utilized with any of the embodiments described herein and can be particularly utilized with any of the structures shown and described with reference to FIG. 2-FIG. 12.

For some embodiments, the control sequences 100 are provided in data format as entries in a spreadsheet, such as a .csv file or other known database formats. Included in the control sequences 100 are input levels 110, input wave file 120 (which has a digital representation of the input signal), first control labels 130, first control target values 140, second control labels 150, second control target values 160, raw input wave data 170, and target wave data 180. Of course, it should be appreciated that, depending on the number of controls that are being adjusted, the control sequences 100 can be extended to accommodate third controls, fourth controls, etc. Each row of the example control sequence of FIG. 1 may be considered a step in the control sequence. Similarly, a column (e.g., control target values 140, 160) may be considered a control sequence for a specific control (e.g., a potentiometer) of an audio system. In this regard, example values in the control sequences 100 correspond to valid predetermined control settings for their respective example controls, and thus the values in the illustrated FIGURE are presented only by way of illustration and not by way of limitation. Further, the control sequences may be located in one file or spread over more than one file. For example, a first control sequence for first and second controls of a system may be in a first file, while a second control sequence for third and fourth controls of the system are in a second file. As another example, a first file may include just the input levels and the input wave file locations, a second file has a first control sequence for a first control of a system, and a third file has a second control sequence for a second control of the system. When the control sequence is broken up into several files, then a control sequencer (see FIG. 12) reads each file for a specific step in the sequence to create that step in the sequence. In some embodiments, a same input wave file may be used for each step in the sequence, and in such embodiments, an indication for the input wave file for each step is not needed in the overall control sequence.

Thus, for example, if the controls are potentiometers on an audio system, then the potentiometer positions for each potentiometer are generated from the values of their respective control sequences 100. Specifically, if one potentiometer is a high (treble) control (e.g., denoted as first control 130) and another potentiometer is a drive control potentiometer (e.g., denoted as second control 150), then the control target values 140, 160 determine the potentiometer positions for treble and drive, respectively. Although a treble control sequence with target control values 140 and a drive control sequence with target control values 160 are used as illustrative examples, it should be appreciated that the control sequence 100 may include a volume control sequence with volume control values; a gain control sequence with gain control values; a treble control sequence with treble control values; a bass control sequence with bass control values; a tone control sequence with tone control values; an equalizer control sequence with equalizer control values; a reverb control sequence with reverb control values; a contour control sequence with contour control values; a presence control sequence with presence control values; etc. That is, the control sequence is any control sequence that is suitable for an associated audio system.

Continuing with the embodiment of FIG. 1, in some embodiments, such as for potentiometers, control positions can be expressed as floating-point values between 0 and 1, thereby allowing for appropriate scaling to accommodate different systems. For example, controls in some systems may have a total turn angle of 300 degrees, while other systems may have a total turn angle of 180 degrees, etc. Consequently, 0 represents the lowest value for a control while 1 represents the highest value for the control for any given system. It should be appreciated that the control, for other embodiments, may be toggle switches (with switch positions) or sliders (with slide positions), depending on the manufacturer and their design specifications. Of course, multi-way switches, concentric potentiometers, push-pull potentiometers, rotary encoders, foot switches, touch displays, electronic inputs, positioning systems (e.g., for a microphone) and other mechanisms are also contemplated in this disclosure.

Ultimately, the control sequences 100 have a combination of sequence values that represents a sufficiently high number of samples that are used to determine a responsive behavior of the audio system. Also, the combination of sequence values from all control sequences can be generated by a sufficiently dense random sampling of control points. Preferably, the control sequences 100 provide a minimally acceptable and sufficiently high number of samples for the changing of each control setting to reduce mechanical wear of the controls. In other words, rather than recursively measuring every possible combination of settings, the disclosed embodiments sample only a subset of all the combinations, thereby reducing the time that is required to obtain a sufficient number of samples.

For instance, in some embodiments, the combination sequence values for each control represent sample values from a random distribution. Here, the sample values can be sorted to reduce or minimize wear of the controls of the audio system. As another example, the combinations of values can represent Markov chain Monte Carlo (MCMC) sampling values for a sufficiently dense random sampling of control settings. Insofar as those having skill in the art understand how to implement MCMC (or other probabilistic) sampling, further discussion of MCMC is omitted herein.

In operation, a device interface can include a control device that reads control position information from the control sequences 100. The control position information is optionally processed and is conveyed to corresponding motor controllers (described in greater detail below). The motor controllers control associated motors that couple to associated amplifier controls via corresponding control couplers to set the controls associated with the audio system to control values corresponding to the read control positions.

Because of the randomization of the sequence values, effects from system-related artifacts or process-related artifacts (such as drift) are reduced. Furthermore, because a sufficiently high number of samples are collected, the responsive behavior of the audio system is determinable through statistical processes. After setting the amplifier control value according to the read value (e.g., after all the motors have stopped), a signal generator (also described in greater detail below) provides an input signal to the audio system. A receiver (described below) receives an output signal from the audio system, with the output signal representing a response of the audio system to the input signal at the control settings. The response is recorded and stored. In some embodiments, each step in a sequence can specify audio file(s) to be used for recording. As such, the input signal at each step of a sequence can be the same or different. In embodiments where a sequence does not specify an audio file, the same audio file will be used for each step in the sequence.

The system repeats this process until all the values in the control sequences 100 have been applied and their respective responses have been recorded. In this regard, the process can be started, stopped, restarted, etc. Moreover, where an audio system is implemented in two or more identical instances, it may be possible to divide the control sequence file into two or more files, each run on an associated instance of the audio system. The results from the collection of iterations can then be assembled into an indication of the responsive behavior of the audio system.

When all the responses have been collected and stored, then the collected responses can be used to determine the responsive behavior of the audio system. Alternatively, the collected responses can be used to train neural network-based models to emulate the responsive behavior of the audio system, to understand and distinguish the behavior of one type of amplifier (or system) from another type of amplifier (or system), to distinguish one manufacturer from another, or to determine characteristic differences on a multitude of other variables. Such a model can learn to emulate the responsive behavior of the audio system at any given control setting, within the control space that is defined by the automated recording process.

Turning now to FIG. 2, an embodiment of mechanical components in a robotic system 200 are illustrated. The illustrated mechanical components can be integrated into an implementation of the device interface and can be utilized for determining responsive behaviors of audio systems, as noted more fully herein. Moreover, the illustrated mechanical components shown in FIG. 2 can be utilized with any of the embodiments described herein and can be particularly utilized with any of the structures, processes, etc., shown and described with reference to FIG. 1, and FIG. 3-FIG. 12. Moreover, although illustrated as a single instance, the structures of FIG. 2 can be scaled to accommodate audio systems of various complexities.

The robotic system 200 comprises a control device 205, such as, for example, a Raspberry Pi® system, computer, dedicated microcontroller, or other type of programmable processor. For the embodiment of FIG. 2, the control device 205 can circuitry to implement the sequence controller, motor controllers, and other control/processing as described more fully herein.

For instance, the control device 205 can include motor controller(s), e.g., that are implemented using discrete logic circuits (e.g., application-specific integrated circuit (ASIC) having appropriate combinational logic gates, programmable gate array (PGAs), field-programmable gate arrays (FPGAs), etc.). By way of example, if the control device 205 is a Raspberry Pi® system, then a 16-channel pulse-width modulated (PWM) servo bonnet for Raspberry Pi® from Adafruit Industries LLC in conjunction with available Python® libraries can be used to program the motor controller(s). As another example, for a stepper motor, the motor controller can be a low-voltage stepper motor driver, such as the DRV8834 module from Texas Instruments, Inc.

As illustrated, a motor controller within the control device 205 is communicatively coupled to a motor 210. Insofar as communication (wired or wireless) between the control device 205 and the motor 210 are known in the art, further discussion of the interface is omitted herein.

Each motor controller receives its respective sequence values iteratively from the control sequencer (also implemented using appropriate logic circuits). Upon receiving the sequence value, each motor controller converts the sequence value to a corresponding motor setting, with each motor setting corresponding to its respective control setting. It should be appreciated that the control device 205, for some embodiments, can also include a signal generator and/or receiver, and thus also records and/or stores the response from the audio system using, for example, a universal serial bus (USB) audio interface between an audio system (not shown) and the control device 205.

In the illustrated robotic system 200, the motor 210 is operatively coupled to its corresponding motor controller (in the control device 205) through, for example, an electrical connection 215 (e.g., wiring). For some embodiments, the motor 210 can be controlled by the control device 205 through wireless communication protocols. Ultimately, the control of the motor 210 is determined by the values from the control sequences 100 (FIG. 1).

Continuing, the motor 210 is mechanically coupled to a set of gears 220, 225, which are controlled and turned by the motor 210. The motor 210 and the gears 220, 225 are mechanically coupled together through a housing 230 that affixes the gears 220, 225 in relation to the motor 210. It should be appreciated that the gear ratio can be adjusted to increase or decrease the number of turns that are required by the motor 210 to appropriately change the control settings. By way of example, when using the Adafruit apparatus, the turning range is approximately one-hundred-and-twenty degrees (~120°). Thus, to extend the rotational range to ~270°, a gear ratio of approximately 9:4 should be applied. As another example, when using HS-422 servo motor (by Hitec), which has ~180° turning angle, a gear ratio of approximately 15:9 should be applied to ultimately obtain a ~300° range of motion at the control. As one can appreciate, depending on the final rotational range, the gear ratios can be altered in direct mathematical proportions.

For some embodiments, the motor 210 is a servo motor, while for other embodiments, the motor 210 is a stepper motor. It should be appreciated that the type of motor 210 is largely dependent on the design, given the limitations of each choice, and may comprise in practice, a motor, linear actuator, or other device capable of motive response. Servo motors can cover a continuous range of angles, although they are typically limited by the maximum angle (e.g., less than 180 degrees), which in turn necessitates utilization of gears. In contrast, stepper motors have no such angle limitations. Although stepper motors have a discrete number of steps per resolution (e.g., 360 degrees), the accuracy of stepper motors is sufficient for most (if not all) practical settings, insofar as those settings are typically adjusted by the human hand. Some servo motors have a fourth wire that allows for feedback control of the motor position, which permits the user to quantify the error of the control positioning. Other types of motors can also have or be used in conjunction with analog-to-digital converters (ADC) that allow for feedback reading by the control device 205.

A mechanical rod 235 (or other connector) is affixed to the final gear 225, and a control coupler 240 is mechanically affixed to the rod 235. As such, the control coupler 240 becomes mechanically coupled to its corresponding motor 210 through the rod 235 and the gears 220, 225. In operation, the control coupler 240 is mechanically coupled (or is otherwise adapted to be coupled) to a corresponding control of an audio system (not shown in FIG. 2 but described in detail below). This allows the control coupler to mechanically change a corresponding control setting in direct relation to (and in response to) its corresponding motor setting. The changing of each control setting affects the response of the audio system.

In the embodiment of FIG. 2, the control coupler 240 is mechanically coupled (or is otherwise adapted to be coupled) to the rod 235 with a universal joint 245. The universal joint 245 permits compensation for misalignment and, sometimes, for greater tolerances when different audio systems have slightly different control spacings.

Figure 3:
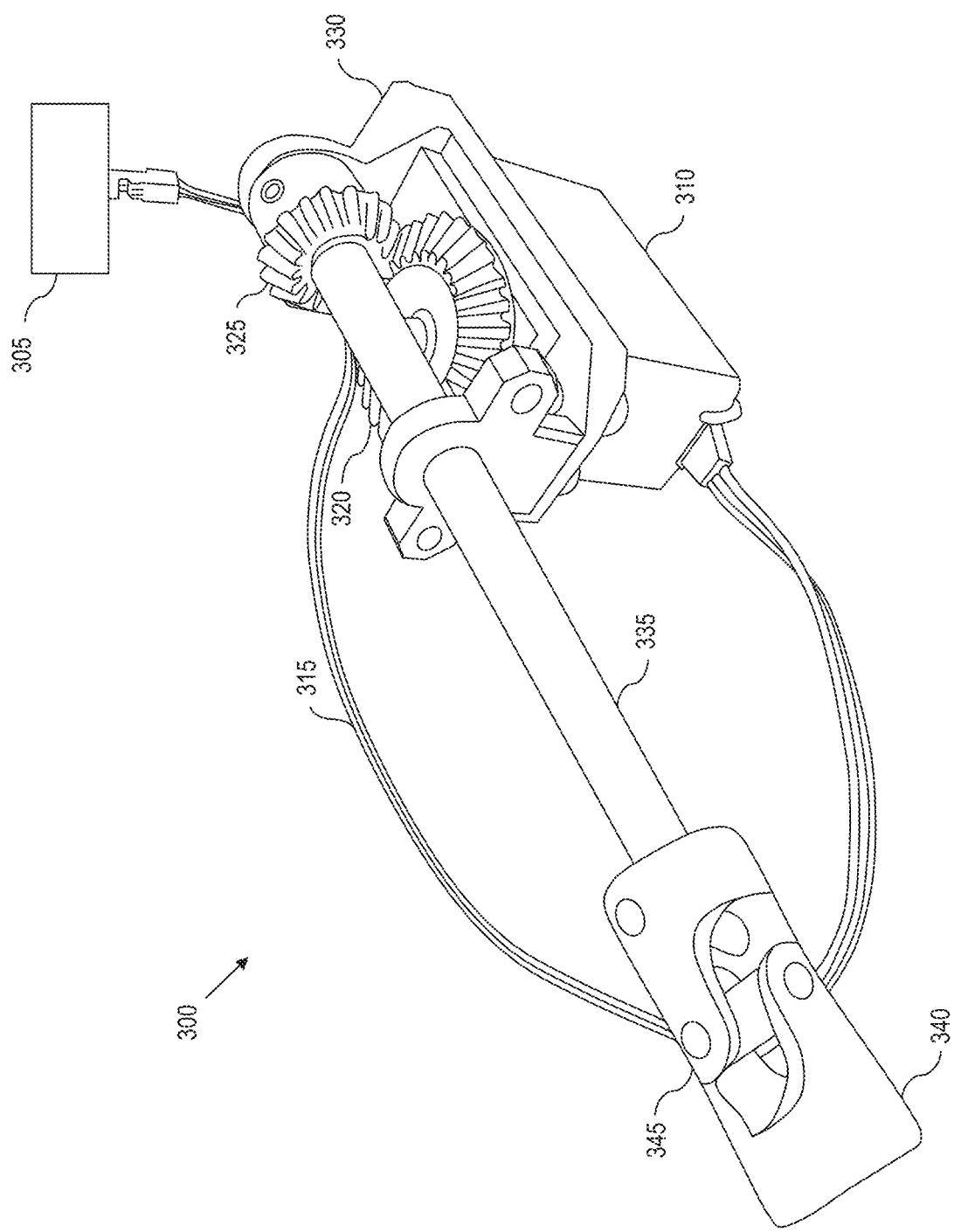
FIG. 3 is a diagram showing another embodiment of mechanical components in the robotic system for determining a responsive behavior of audio systems.

Referring now to FIG. 3, a diagram shows another embodiment of mechanical components in a robotic system 300 for determining responsive behaviors of audio systems. The illustrated mechanical components shown in FIG. 3 can be utilized with any of the embodiments described herein and can be particularly utilized with any of the structures, processes, etc., shown and described with reference to FIG. 1-FIG. 2, and FIG. 4-FIG. 12.

Unlike the system 200 of FIG. 2, which shows parallel-axes gears 220, 225, the robotic system 300 of FIG. 3 shows intersecting-axes gears 320, 325, specifically bevel gears 320, 325. The use of bevel gears 320, 325 provides a more compact design and some degree of space saving (compared to the parallel axes gears 220, 225).

Similar to FIG. 2, the robotic system 300 of FIG. 3 comprises a control device 305 coupled to a motor 310 via an electrical connection 315 (e.g., wiring). In this regard, the control device 305 can be implemented analogous to the control device 200 of FIG. 2. Likewise, the motor 310 can be implemented to the motor 210 of FIG. 2.

A housing 330 is provided for affixing the gears 320, 325 in relation to the motor 310. Moreover, a mechanical rod 335 mechanically couples to the gear 325 such that rotation of the gear 325 causes corresponding rotation of the mechanical rod 335. A control coupler 340 extends from the end of the mechanical rod 335 via a universal joint 345, analogous to like structures described with reference to FIG. 2. Insofar as analogous components to the control device 305, the motor 310, the connection 315, the housing 330, the mechanical rod 335, the control coupler 340, and the universal joint 345 are described in detail with reference to FIG. 2, the illustrated components are not discussed further with reference to FIG. 3.

Figure 4:
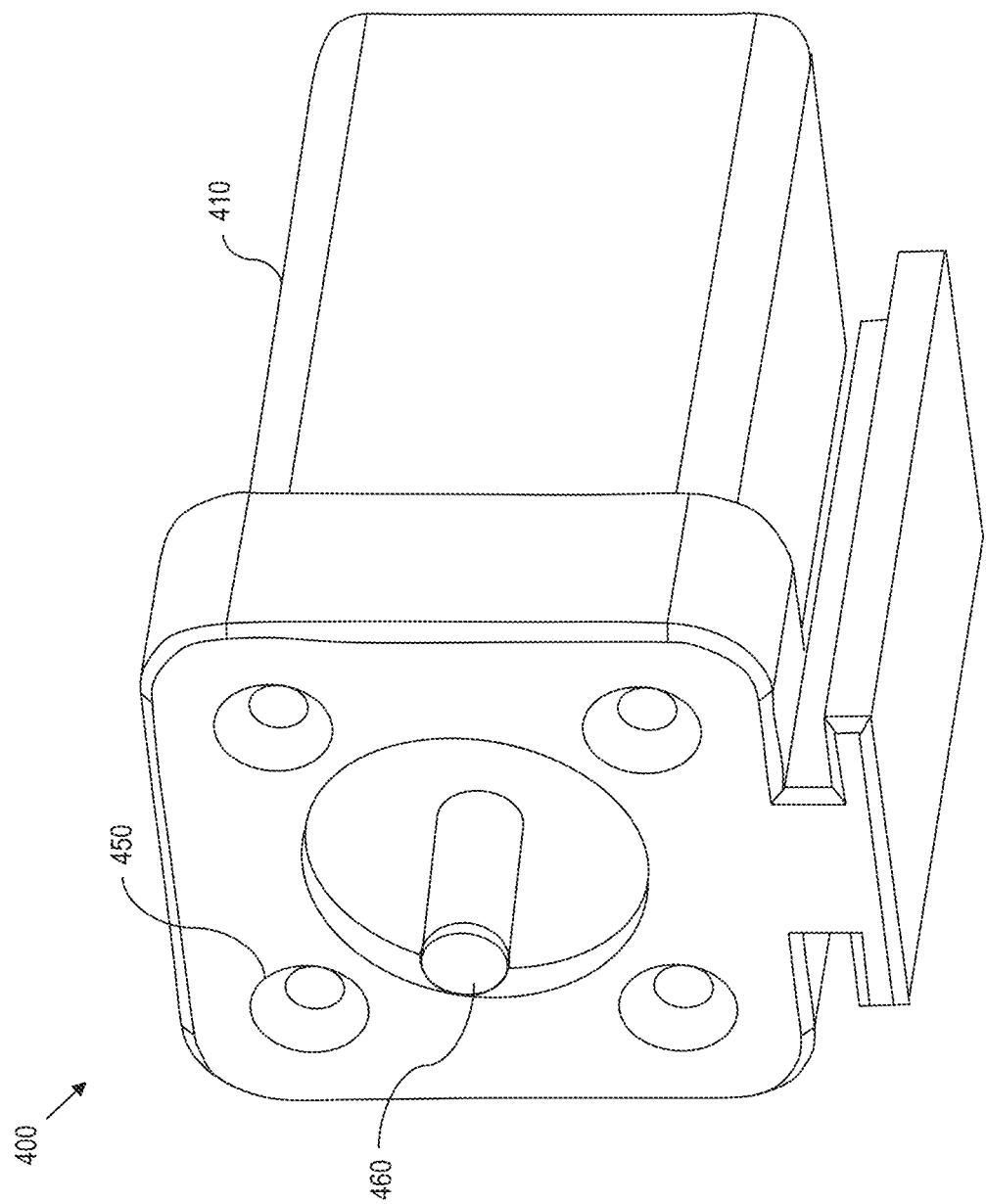
FIG. 4 is a diagram showing an enlarged view of an embodiment of the motor of FIG. 3.

Turning now to FIG. 4, an enlarged view of an embodiment of a motor 410 is illustrated. The illustrated motor shown in FIG. 4 can be utilized with any of the embodiments described herein and can be particularly utilized with any of the structures, processes, etc., shown and described with reference to FIG. 1-FIG. 3, and FIG. 5-FIG. 12. For instance, the motor 410 can be used as the motor 210 of FIG. 2 or the motor 310 of FIG. 3.

As illustrated, a perspective view of the motor 410 is shown from the direction of attachment points 450 and axle 460. The axle 460 can mechanically couple to one of the gears 220, 320 (FIG. 2, FIG. 3, respectively), while the attachment points 450 are used to secure the motor 410 to its appropriate position in the housing 230, 330 (FIG. 2, FIG. 3, respectively).

In alternative embodiments, using a stepper motor 410 such as a National Electrical Manufacturers Association (NEMA)-8 stepper motor) allows for more precise control and, concurrently, dispenses with the need for gears (as the stepper motor can rotate to any desirable angle). In some embodiments, the stepper motor 410 has two hundred (200) steps per revolution with micro-stepping (which can be increased as desired). The stepper motor 410 also permits direct control of the motor setting from the control sequencer.

Figure 5:
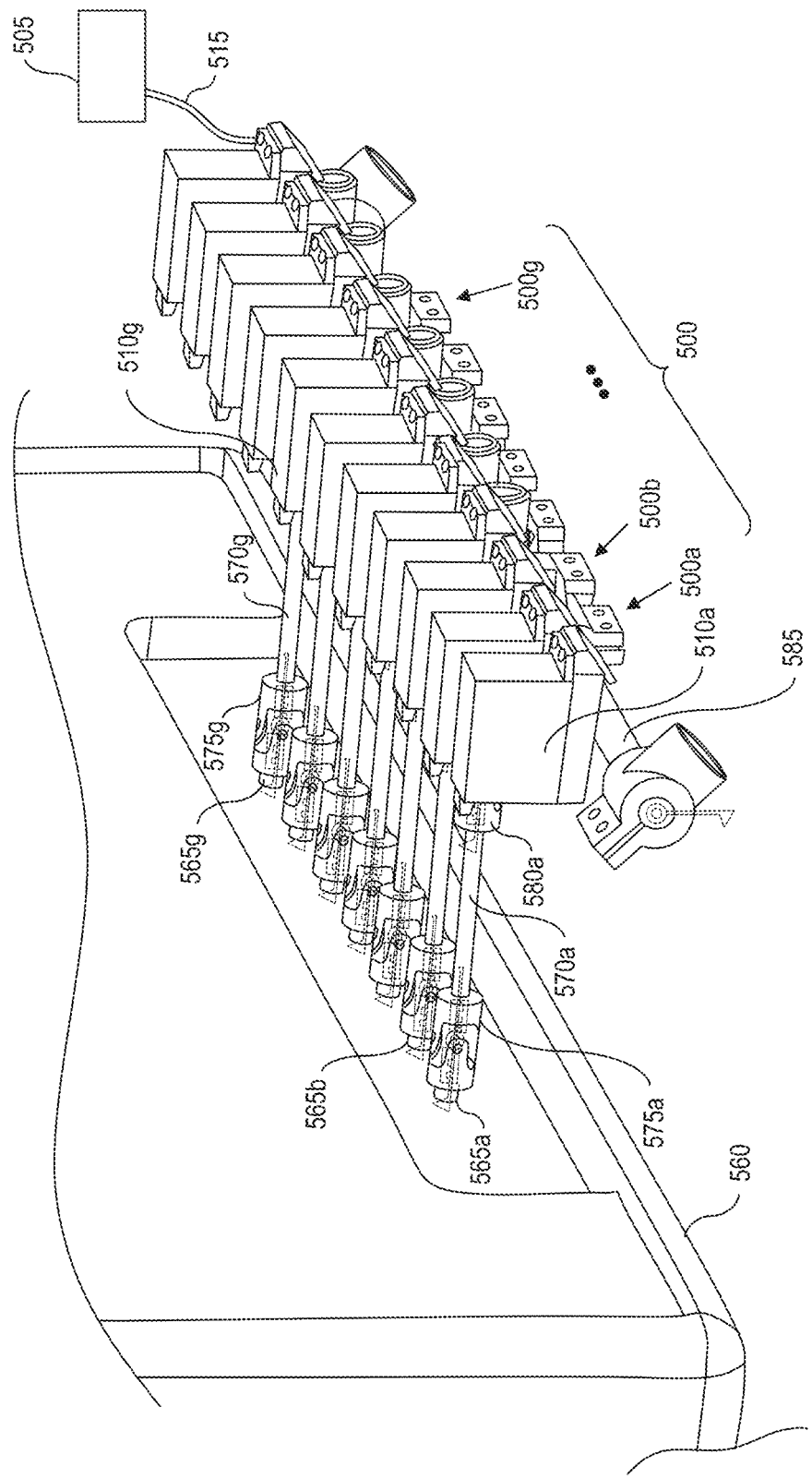
FIG. 5 is a diagram showing an embodiment of a robotic system that is operatively coupled to an audio system to measure the responsive behavior of the audio system.

With the systems in FIG. 1 through FIG. 4 in mind, attention is turned to FIG. 5, which shows a robotic system connected to an audio system 560. The illustrated components shown in FIG. 5 can be utilized with or otherwise analogous to any of the embodiments described herein and can be particularly utilized with any of the structures, processes, etc., shown and described with reference to FIG. 1-FIG. 4, and FIG. 6-FIG. 12.

As illustrated, the robotic system includes a set of robotic arm assemblies. In this instance, not every robotic arm assembly of the robotic system is utilized. Rather, since the example audio system 560 includes seven potentiometers, only seven robotic arm assemblies 500a-500g (collectively 500) are utilized.

Moreover, a control device 505 couples to motors 510a-510g (collectively 510) of the robotic arm assemblies 500a-500g via suitable wiring 515. In this regard, the control device 505 is analogous to the control device 205 (FIG. 2) and/or control device 305 (FIG. 3) except that the control device 505 is expanded to independently control all seven (in this example) robotic arm assembles 500a-500g. In this example implementation, the control device 505 processes one or more control sequences (e.g., see control sequence 100, FIG. 1), except that the control sequence(s) are expanded to define settings for all seven controls of the audio system 560. In this regard, depending upon the implementation, the control sequences can be dynamically generated by the control device 505, e.g., at run time. In other example implementations, the control sequence is generated in advance of operation. For instance, control sequences can be generated by the control device 505 in advance, or the control sequences can be generated by a remote processing device, and then loaded into the control device 505.

In this regard, the motors 510a-510g (collectively 510) of the robotic arm assemblies 500a-500g can be implemented in a manner analogous to any of the motor structures described more fully herein, including those embodiments of FIG. 2-FIG. 4. In this regard, gears and other suitable mechanical coupling/linking structures may also be provided (not explicitly shown in FIG. 5), e.g., depending upon the motor configuration.

As shown in FIG. 5, the audio system 560 (e.g., illustrated as a guitar amplifier) comprises multiple controls 565a-565g (collectively, 565), with each control 565 corresponding to one of the robotic arm assemblies 500a-500g, respectively. The robotic arm assemblies 500a-500g are mechanically coupled to their respective controls 565 through mechanical rods 570a . . . 570g (collectively, 570) with connectors 575a . . . 575g (collectively 575—with or without universal joints) in a manner similar to analogous components in FIG. 2 and FIG. 3.

Moreover, in some embodiments, an additional connector 580a-580g can be connected at a base of each mechanical rod 570a-570g. Each additional connector 580a-580g can have a universal joint to facilitate greater variance and flexibility in adapting the system to various audio systems.

Also as illustrated, the robotic arm assemblies 500a-500g are positioned relative to each other using a frame 585. Thus, as one can appreciate, for different types of audio systems (with different configurations), a different (but appropriate) frame 585 can be used to align the robotic arm assemblies 500a-500g to their respective controls 565a-565g. In some embodiments, an adjustable frame 585 and/or an adjustable interface on the frame 585 (such as universal joints) can be used so that a single frame can accommodate multiple audio system configurations. For instance, using set screws or other fastening means, in some embodiments, it may be possible to reposition each robotic arm assemble 500a-500g along the length of the frame 585.

The mechanical coupling of the robotic arm assemblies 500a-500g to their respective controls 565a-565g allows control over the settings of the audio system in accordance with control sequences, as explained with reference to FIG. 1. For example, if the controls 565a-565g include a volume controller, a gain controller, a treble controller, a bass controller, a tone controller, a reverb controller, a contour controller, a presence controller, or any other type of control, then each of those controllers 565 can be set according to their respective control sequences.

In some embodiments, at each setting, a signal generator (not expressly illustrated in FIG. 5) provides an input signal to the audio system 560 and, thereafter, a receiver (not expressly illustrated in FIG. 5) receives an output signal from the audio system 560, with the output representing the response of the audio system 560 to the input signal at the control 565 settings.

As shown in FIG. 1 through FIG. 5, aspects of the present disclosure teach systems and processes for determining responsive behaviors of audio systems without using every setting on the audio system. For instance, disclosed embodiments of the robotic systems teach a control sequencer that provides control sequences. In some embodiments, the control sequence(s) use combinations of sequence values that represent a sufficiently high number of samples to adequately generate a responsive behavior that reflects the actual audio system, even across a full range of control settings in some instances.

Because the combinations of sequence values do not recursively measure every possible combination but, instead, sample only a subset of all the combinations, the disclosed embodiments reduce the time and the wear associated with determining responsive behaviors of audio systems. Also, because of the randomization of the sequence values, system-related artifacts or process-related artifacts are reduced. Furthermore, because a sufficiently high number of samples are collected, the responsive behavior of the audio system is determinable through known statistical processes.

To illustrate the benefits associated with sufficiently dense random sampling, attention is turned to FIGS. 6 through 10. Initially, it should be observed that a sufficiently dense sample should also consider total allowable mechanical wear that is determinable from, for example, datasheets for the hardware (e.g., potentiometers or other hardware controllers). Thus, for example, a particular potentiometer might have a nominal life expectancy of between one million (1,000,000) and two million (2,000,000) cycles (fully clockwise and fully counterclockwise). Given that the process of taking measurements for the audio system should not induce a significant amount of mechanical wear, for this example, one percent (1%) of the nominal life expectancy would correspond to between ten thousand (10,000) and twenty thousand (20,000) cycles. In the present disclosure, the mechanical wear is reported in a unidirectional manner, so that one (1) cycle is defined as a full rotation, either full clockwise or full counterclockwise. Thus, mechanical wear of 1% of the nominal life expectancy would permit approximately forty thousand (40,000) full turns. Thus, for this example, a sufficiently dense random sample would have a sample size that is less than 40,000.

One more consideration relates to the data itself. By way of example, for twenty thousand (20,000) samples of input-and-output audio pairs, if each sample is forty-eight (48) kilohertz (kHz) at sixteen (16) bits of resolution, the input-and-output data alone would occupy approximately 17.8 gigabytes (GB) of data.

With these example numbers from this example as context, attention is turned to FIG. 6, which shows example numerical values that represent mechanical wear for different numbers of controls when regular grid sampling is employed for five (5) equally spaced control values. For example, for two controls with five control values each (shown in the first row of table in FIG. 6), the total number of samples would be 25, with a maximum wear of 9 and an average calculated wear of 5. As one can see from FIG. 6, a linear increase in the number of controls results in an exponential increase in the number of samples, the maximum wear, and the average wear. By the time that ten (10) controls are considered, there are nearly ten million samples (specifically, 9,765,625 samples) that result in maximum wear and average wear of 3,906,249 and 488,280, respectively.

Extending the number of possible settings from five (5) values to eleven (11) values results in even greater wear to the hardware. As shown in FIG. 7, a 2-control-11-settings configuration results in 121 samples with the wear being more-than-double the wear shown for the 2-control-5-setting configuration of FIG. 6. A 7-control-11-settings configuration (in FIG. 7) has approximately twice the number of samples as a 10-control-5-settings configuration (in FIG. 6), with the maximum wear and average wear in FIG. 7 eclipsing the corresponding values in FIG. 6. As one can readily observe, the number of samples becomes impractically high, even exceeding the total life cycle of some hardware components, as either the number of controls or the number of settings increases.

By comparison, numerical examples for sufficiently dense random sampling are shown in FIG. 8. Specifically, FIG. 8 shows a table for various 5-settings controllers. Unlike FIG. 6, the 2-control-5-settings configuration results in a maximum wear of 3 (as compared to 9 in FIG. 6) and an average wear of 2 (as compared to 5 in FIG. 6). Likewise, a comparison of the 5-control-5-settings configuration shows that the sufficiently dense sorted random sampling (in FIG. 8) provides a remarkable reduction in maximum and average wear compared to the regular grid sampling (in FIG. 6). In other words, the sufficiently dense sorted random sampling results in less mechanical wear, while concurrently allowing for substantially even distribution of sample values.

Figure 9:
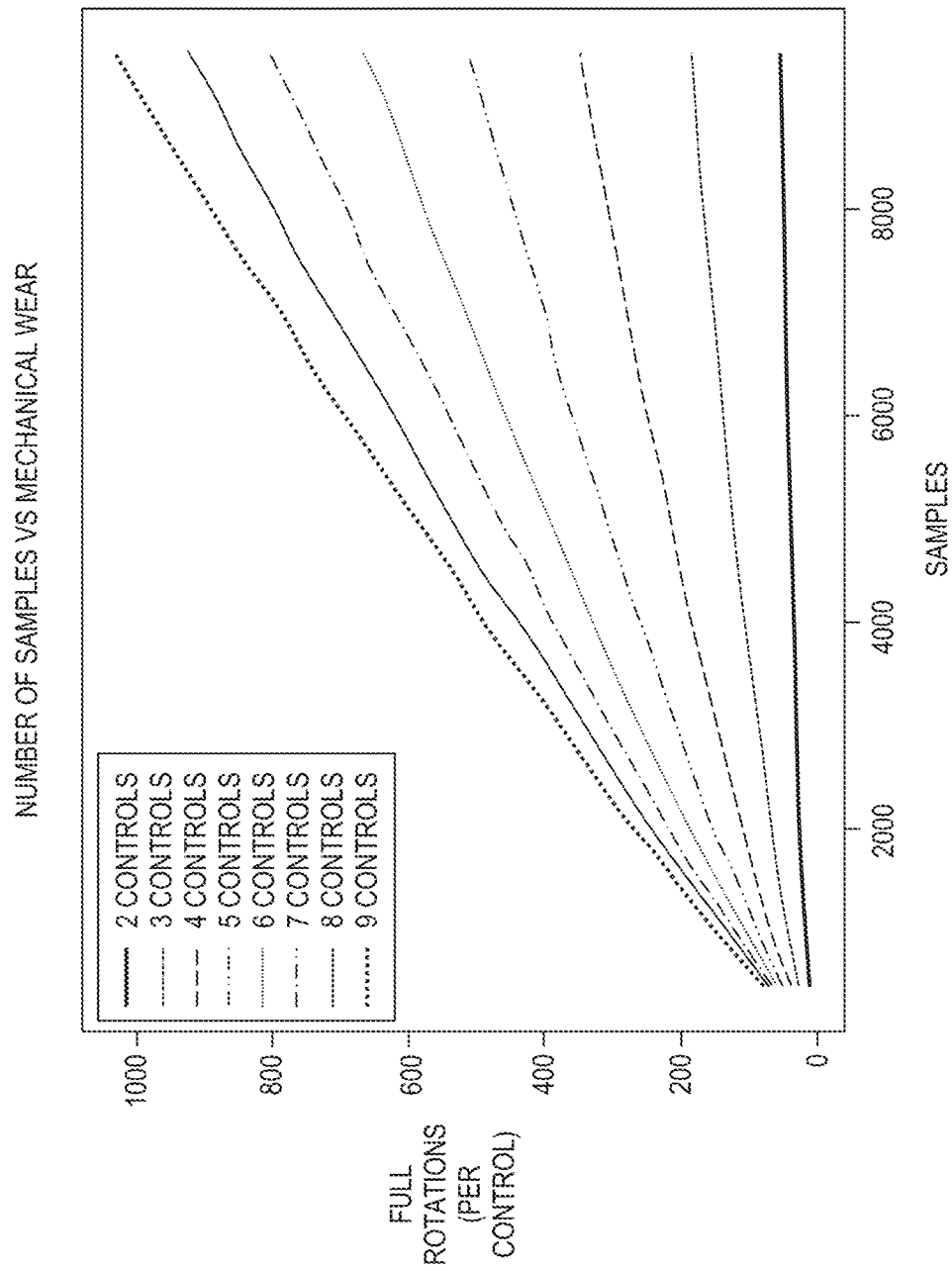
FIG. 9 is a graph that visually illustrates mechanical wear as a function of the number of samples for different numbers of controls.

FIG. 9 is a graph that visually illustrates mechanical wear as a function of the number of samples for different numbers of controls. As shown in FIG. 9, the mechanical wear relates linearly (rather than exponentially) to the number of samples in the sufficiently dense sorted random sampling. Thus, unlike the regular grid sampling, wear on hardware components is reduced considerably, even as much as several orders of magnitude.

An additional benefit of sufficiently dense sorted random sampling includes an ability to cover a dense sampling space with few (if any) duplicative values. Furthermore, the random sorted sampling permits better interpolation and shorter travel between consecutive settings. Comparisons of the regular grid sampling and sufficiently dense sorted random sampling are shown in FIGS. 10 and 11. Specifically, FIG. 10 shows numerical examples of average travel across all pairs of consecutive values for a regular grid sampling with five (5) equally spaced control values, while FIG. 11 shows corresponding values for a sufficiently dense random sampling. As shown in FIGS. 10 and 11, the maximum travel distance, the minimum travel distance, and the average travel distances are much better for the random sorted sampling than the regular (exhaustive) grid sampling.

It should also be noted that, because of such a large reduction in the sampling size, the random sorted sampling also provides the additional benefit of savings in both time and data storage. As noted more fully herein, in some embodiments, the combination sequence values for each control represent sample values from a random distribution. Here, the sample values are sorted to reduce or minimize wear of the controls of the audio system.

Figure 12:
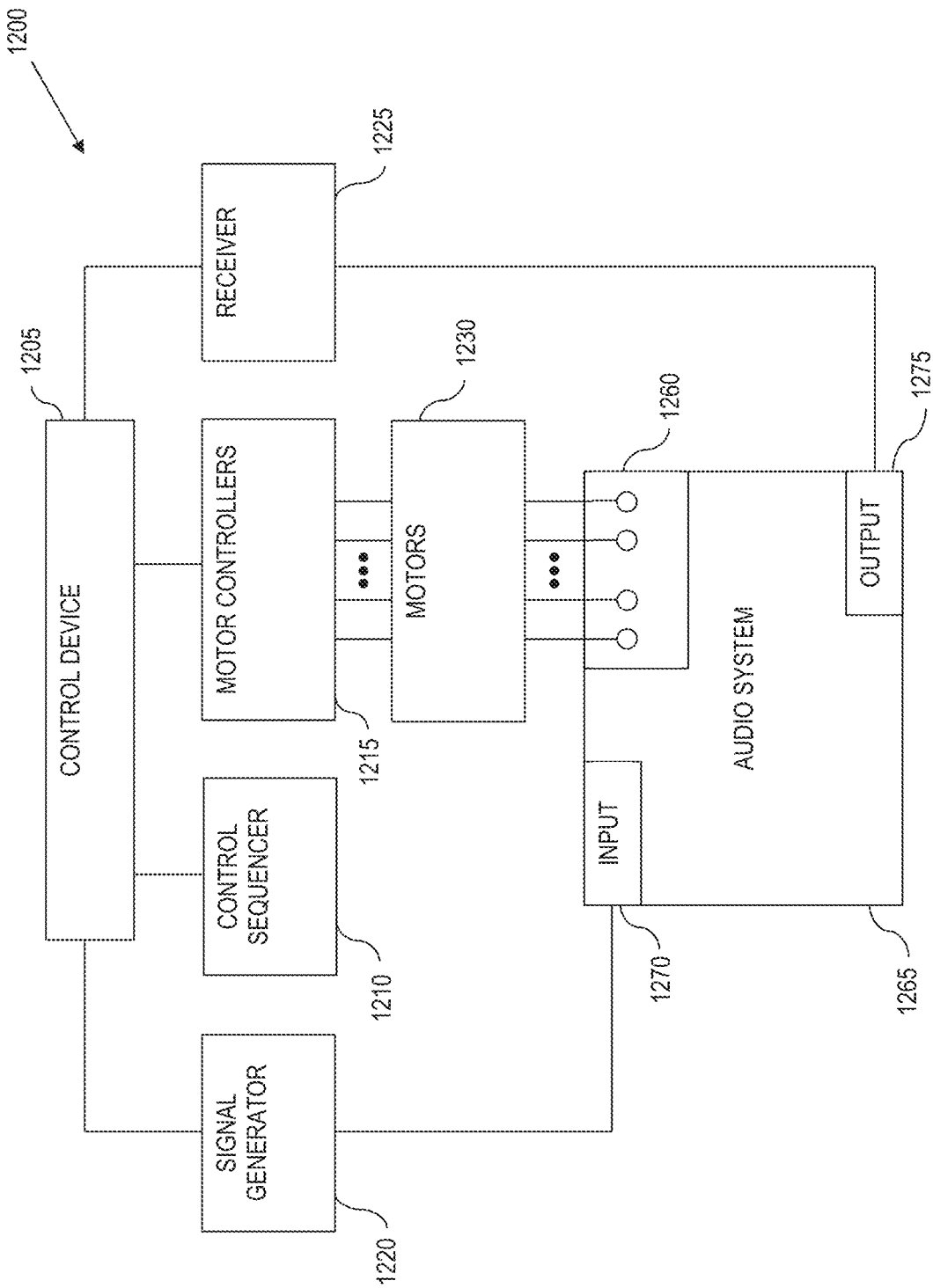
FIG. 12 is a block diagram showing components of a robotic system according to aspects of the present disclosure.

Referring to FIG. 12, a block diagram illustrates an example system robotic system that can reduce, time, wear, and data-storage requirements associated with determining responsive behaviors of audio systems. The illustrated block diagram shown in FIG. 12 can be utilized with any of the embodiments described herein and can be particularly utilized with any of the structures, processes, etc., shown and described with reference to FIG. 1 through FIG. 11.

Notably, the systems and processes as discussed with reference to FIGS. 1 through 11 can be broadly depicted in a robotic system 1200, such as in an embodiment that is shown in FIG. 12. Generally speaking, the system 1200 comprises a control device 1205 that is operatively coupled to a control sequencer 1210, motor controller(s) 1215, a signal generator 1220, and a receiver 1225. The motor controller(s) 1215 are operatively coupled to motors 1230, which are in turn mechanically coupled to controls 1260 associated with an audio system 1265. The signal generator 1220 is operatively coupled to an input 1270 of the audio system 1265 and the receiver 1225 is operatively coupled to an output 1275 of the audio system 1265.

Notably, the blocks illustrated in FIG. 12 need not correspond verbatim identically to structure shown in preceding FIGURES. For instance, FIG. 12 shows a control device 1205 in a separate box to show how a supervisory processor can control the various components, including the signal generator 1220, control sequencer 1210, motor controllers 1215 and receiver 12225. However, in practice, any combination of these functions can be implemented in one or more devices, including a single device as illustrated by the control device 205 of FIG. 2 and/or the control device 305 of FIG. 3. Moreover, the device interface described broadly herein, can be implemented by the hardware that couples the control sequencer values to the audio system, e.g., the motor controllers 1215, motors 1230 and any additional structures (e.g., universal joints, mechanical arms/linkages, etc.).

Generally, the control device 1205 controls the signal generator 1220, the control sequencer 1210, the motor controllers 1215 and the receiver 1225 to operate in an iterative loop such that for each iteration, the control device: uses a next sequence value from each control sequence to control a corresponding motor controller (and hence, to control a corresponding motor to adjust the associated control of the audio system 1265; uses a next sequence value from the second control sequence to control the second motor controller to adjust the second motor, and hence, adjust the second control; triggers the signal generator to communicate the input signal to the audio system after the first motor and the second motor are adjusted; triggers the receiver to collect an output of the audio system; store the collected output as a unique capture instance; increment the next sequence value from the first control sequence; and increment the next sequence value from the second control sequence.

In operation, the control device 1205 reads control sequences (e.g., as discussed in reference to FIG. 1) from the control sequencer 1210 (which may be implemented in either hardware or software). Using the control sequences, the control device 1205 provides instructions to the motor controllers 1215 to turn their respective motors 1230, thereby correspondingly adjusting the controls 1260 associated with the audio system 1265. As noted more fully herein, the adjustments to the controls 1260 may comprise adjusting a potentiometer, adjusting an encoder, selecting a switch position, setting a microphone to a desired position to record the output of an associated speaker cabinet (positioning a microphone along one or more axes relative to a speaker), setting a microphone to capture an environment associated with the audio system, etc.

After setting the controls 1260 according to the control sequencer 1210, the control device 1205 instructs the signal generator 1220 to provide a signal to the audio system 1265 through its input 1270 (e.g., input jack or other known input port). The audio system 1265 outputs a response through its output port 1275 and the receiver 1225 receives that response. The control device 1205 then records and stores the response.

In some embodiments, the control device 1205 analyzes the information collected by the receiver to determine a responsive behavior of the audio system 1265.

In other embodiments, the data from the system 1200 is output to a remote processing device for analysis and to generate the responsive behavior of the audio system 1265. For instance, the collected and stored data can be used as training data to train a neural network such that the neural network mimics the behavior of the audio system 1265, including the ability to mimic the behavior of the audio system 1265 not only at one "snapshot" or one configuration, but across a range of settings.

It should be appreciated that, for some embodiments, the control device 1205 can be implemented using the Raspberry Pi® processor that is described in detail with reference to FIG. 2. Similarly, the motor controller 1215 and the motors 1230 can be implemented using the motor controller and the motors shown with reference to FIGS. 2, 3, 4, 5, or any combinations of the corresponding components described in those drawings. Likewise, the audio system 1265 and the controls 1260 can be implemented using the components shown in the embodiment of FIG. 5. As those having ordinary skill in the art will appreciate, the various components shown in FIGS. 1 through 5 can be configured as a general robotic system 1200, such as that shown in FIG. 12.

By way of an illustrative example, assume that the audio system 1265 includes two controls. Here, the control sequencer 1210 provides a first control sequence and a second control sequence, the first control sequence corresponding to a first control associated with the audio system 1265, and the second control sequence associated with a second control on the audio system 1265.

The second control is typically different from the first control, e.g., a volume control and tone control, a volume control and a bright switch, a gain control and a microphone placement relative to a speaker, etc. Regardless of control purpose, the first control sequence comprises a first sequence of values, where each value corresponds to a valid predetermined control setting for the first control. Likewise, the second control sequence comprises a second sequence of values, where each value corresponds to a valid predetermined control setting for the second control.

In some embodiments, a combination of the first sequence values and the second sequence values represents a sufficiently high number of samples to substantially determine a responsive behavior of the audio system, where the combination of the first sequence values and the second sequence values can further represent a sufficiently dense random sampling of control settings.

A first motor controller 1215 is communicatively coupled to the control sequencer 1210, for iteratively receiving each first sequence value from the control sequencer 1210. The first motor controller 1215 converts each first sequence value to a corresponding first motor setting. Here, a first motor 1230 is operatively coupled to the first motor controller 1215, the first motor 1230 being responsive to the first motor setting. As best described with reference to FIG. 2-FIG. 5, a first control coupler is (adapted to be) mechanically coupled to the first motor 1230 and the first control coupler is also (adapted to be) mechanically coupled to the first control. The first control coupler mechanically changes a first control setting of the first control in response to the first motor setting, the changing of the first control setting affecting the responsive behavior of the audio system.

Analogously, a second motor controller 1215 is communicatively coupled to the control sequencer 1210, for iteratively receiving each second sequence value from the control sequencer 1210. The second motor controller 1215 converts each second sequence value to a corresponding second motor setting. Here, a second motor 1230 is operatively coupled to the second motor controller 1215, the second motor 1230 being responsive to the second motor setting. As best described with reference to FIG. 2-FIG. 5, a second control coupler is (adapted to be) mechanically coupled to the second motor 1230 and the second control coupler is also (adapted to be) mechanically coupled to the second control. The second control coupler mechanically changes a second control setting of the second control in response to the second motor setting, the changing of the second control setting affecting the responsive behavior of the audio system.

The signal generator 1220 provides an input signal to the audio system 1265, and the receiver 1225 receives an output signal from the audio system 1265. The output signal represents a response of the audio system 1265 to the input signal at the first control setting and the second control setting.

Analogous to that described with reference to FIG. 5, in some embodiments, a frame can interface the robotic system to the audio system 1265. Moreover, in some embodiments, the frame is an adjustable interface.

As noted more fully herein, the response of the audio system 1265 to the input signal at the various control settings can be used to train machine-learning algorithms (such as neural networks) to emulate the behavior of the audio system. For such a machine-learning emulation system, the response of the audio system serves as the ground-truth for the machine-learning emulation system. In this regard, the control device 1205 (or a remote processing device—not shown) can implement a machine-learning system for emulating the responsive behavior of the audio system. Here, the machine-learning system is trained using the input signal, the output signal, the first control sequence, and the second control sequence.

The control device may be implemented in hardware, software, firmware, or a combination thereof. In the preferred embodiment(s), the control device is implemented in software or firmware that is stored in a memory and that is executed by a suitable instruction execution system. If implemented in hardware, as in an alternative embodiment, the control device can be implemented with any or a combination of the following technologies, which are all well known in the art: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as being executable out of order from that shown or discussed, including substantially concurrently or in reverse order, depending on the functionality involved, as would be understood by those reasonably skilled in the art of the present disclosure.

The control sequences 100 can be applied through a computer program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted, or otherwise processed in a suitable manner if necessary, and then stored in a computer memory.

Although example embodiments have been shown and described, it will be clear to those of ordinary skill in the art that changes, modifications, or alterations to the disclosure as described may be made. All such changes, modifications, and alterations should therefore be within the scope of the disclosure.

What is claimed is:

1. A system for training a model of an audio system, comprising:
   a signal generator that is configured to provide an input signal to the audio system;
   a receiver that is configured to receive an output signal from the audio system; and
   a processor that is configured to control the signal generator and the receiver such that:
      upon adjustment of a control of the audio system to a first control setting, the processor controls the signal generator to provide the input signal to the audio system, wherein the receiver receives the output signal, corresponding to a first output signal that represents a response of the audio system at the first control setting; and
      upon adjustment of the control of the audio system to a second control setting, the processor controls the signal generator to provide the input signal to the audio system, and the receiver receives the output signal, corresponding to a second output signal that represents a response of the audio system at the second control setting;
   wherein a neural network is trained, based upon the first control setting, the first output signal, the second control setting, and the second output signal, to emulate a responsive behavior of the audio system at least across a range of settings of the audio system corresponding to the first control setting and the second control setting.

2. The system of claim 1, wherein:
   the processor trains the neural network; and
   the processor is implemented in a select one of a computer or a dedicated control device.

3. The system of claim 1, wherein:
   the processor communicates the first control setting, the first output signal, the second control setting, and the second output signal, to a remote processing device; and
   the neural network is trained by the remote processing device.

4. The system of claim 1 further comprising a control sequencer that is configured to provide control sequences, each control sequence having sequence value that causes changes to a corresponding control associated with the audio system;
   wherein:
      a first control sequence associates a first sequence value with the first control setting;
      a second control sequence associates a second sequence value with the second control setting; and a combination of the sequence values across the control sequences represents a sufficiently high number of samples that are used to determine a responsive behavior of the audio system, at least across the range of settings corresponding to the sequence values.

5. The system of claim 4, wherein:
the control sequences present sequence values for a given control of the audio system in a non-linear, non-stepwise manner.

6. The system of claim 4 further comprising:
a motor controller communicatively coupled to the processor, the motor controller operative, responsive to at least one instruction from the processor, to cause a motor to mechanically set the control of the audio system to at least one of the first control setting or the second control setting, based upon the control sequence from the control sequencer.

7. The system of claim 1, wherein:
the neural network is configured to emulate the responsive behavior of the audio system at any given control setting of the control, within a control space that is defined by the first control setting and the second control setting.

8. A system for capturing an audio system, comprising:
a signal generator that is configured to provide an input signal to the audio system;
a receiver that is configured to receive an output signal from the audio system;
a control sequencer that stores a sequence of control settings as a set of steps, each step corresponding to a first control setting for a first control of the audio system and a second control setting for a second control of the audio system; and
a processor that is configured to read control position information associated with a current step within the sequence of control settings, and to control the signal generator and the receiver in a loop such that:
 upon the first control of the audio system set to a value identified by the first control setting of the current step, and upon the second control of the audio system set to a value identified by the second control setting of the current step, the signal generator provides the input signal to the audio system;
 the receiver receives the output signal, wherein the output signal is captured in a manner that is associated with the current step; and
 the current step is updated to a next step in the sequence of control settings,
 wherein the loop repeats until stopped;
wherein:
 a neural network is trained based upon the input signal, the output signal, and associated control setting values for each step in the sequence of control settings that has been processed by the loop, where the neural network corresponds to a responsive behavior of the audio system at least across the control setting values for the first control and the second control that have been processed by the loop.

9. The system of claim 8, wherein:
the processor trains the neural network, wherein:
 the processor is implemented in a select one of a computer or a dedicated hardware device.

10. The system of claim 8, wherein:
the processor communicates the first control setting, the first output signal, the second control setting, and the second output signal, to a remote processing device; and
the neural network is trained by the remote processing device.

11. The system of claim 8, wherein:
the sequence of control settings represents sample values from a random distribution, the sample values sorted to reduce or minimize wear of the first control and the second control.

12. The system of claim 8, wherein a combination of control settings in the sequence of control settings represents a sufficiently high number of samples to substantially model a responsive behavior of the audio system across a range of values of the first control and the second control.

13. The system of claim 8 further comprising:
a first motor controller communicatively coupled to the processor, the first motor controller operative, responsive to an instruction from the processor, to cause a first motor to mechanically set the first control of the audio system to a value identified by the first control setting of the current step.

14. The system of claim 13 further comprising:
a second motor controller communicatively coupled to the processor, the second motor controller operative, responsive to an instruction from the processor, to cause a second motor to mechanically set the second control of the audio system to a value identified by the second control setting of the current step.

15. The system of claim 14 further comprising:
a first control coupler configured to mechanically couple the first motor to the first control of the audio system; and
a second control coupler configured to mechanically couple the second motor to the second control of the audio system.

16. The system of claim 8, wherein the sequence of control settings comprises at least one of:
a volume control sequence comprising volume control values;
a gain control sequence comprising gain control values;
a treble control sequence comprising treble control values;
a bass control sequence comprising bass control values;
a tone control sequence comprising tone control values;
an equalizer control sequence comprising equalizer control values;
a reverb control sequence comprising reverb control values;
a contour control sequence comprising contour control values; and
a presence control sequence comprising presence control values.

17. The system of claim 8, wherein the neural network is configured to emulate the responsive behavior of the audio system at any given control setting within a control space that is defined by the sequence of control settings.

18. A system for capturing audio systems, comprising:
a signal generator that is configured to provide an input signal to an audio system;
a receiver that is configured to receive an output signal from the audio system;
a control sequencer that stores a sequence of control settings as a set of steps, each step corresponding to a first control setting for a first control of the audio system and a second control setting for a second control of the audio system; and a processor that is configured to read control position information associated with a current step within the sequence of control settings, and to collect responses from at least two audio systems, wherein for each audio system, the processor controls the signal generator and the receiver in a loop such that:

the first control of the audio system is set to a value identified by the first control setting of the current step;

the second control of the audio system is set to a value identified by the second control setting of the current step;

the signal generator provides the input signal to the audio system;

the receiver receives the output signal, wherein the output signal is captured in a manner that is associated with the current step; and the current step is updated to a next step in the sequence of control settings, wherein the loop repeats until stopped;

wherein:

a first neural network is trained for a first one of the at least two audio systems based upon the output signal and associated control setting values for each step in the sequence of control settings that has been processed by the loop for that audio system; and a second neural network is trained for a second one of the at least two audio systems based upon the output signal and associated control setting values for each step in the sequence of control settings that has been processed by the loop for that audio system.

19. The system of claim 18, wherein a processor compares the first neural network to the second neural network to distinguish a behavior of the first one of the at least two audio systems from the second one of the at least two audio systems.

20. The system of claim 18, wherein:

the sequence of control settings represent sample values from a random distribution, the sample values sorted to reduce or minimize wear of the first control of the audio system and the second control of the audio system; and a combination of control settings in the sequence of control settings processed in the loop implemented to evaluate at least the first one of the at least two audio systems represents a sufficiently high number of samples to substantially model a responsive behavior of the audio system across values of the first control and the second control of the first one of the at least two audio systems.

* * * * *